Figure 1:
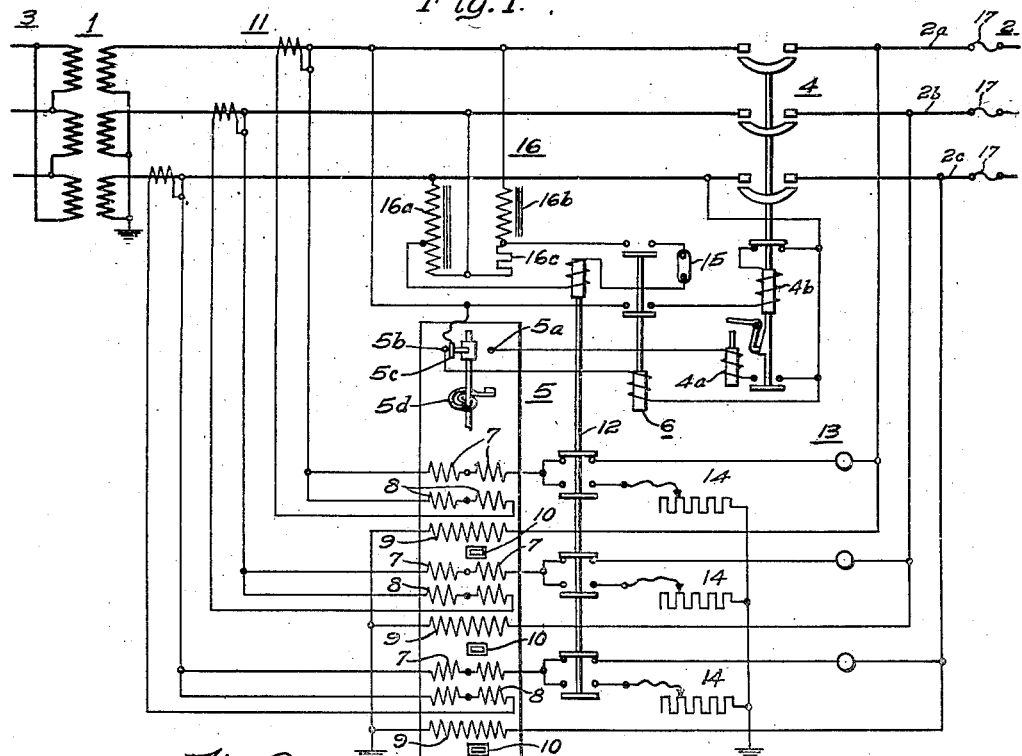

April 16, 1935.    J. S. PARSONS    1,997,697

AUTOMATIC NETWORK PROTECTOR

Filed Aug. 25, 1932    3 Sheets-Sheet 1

WITNESSES:

INVENTOR
John S. Parsons.
BY
ATTORNEY

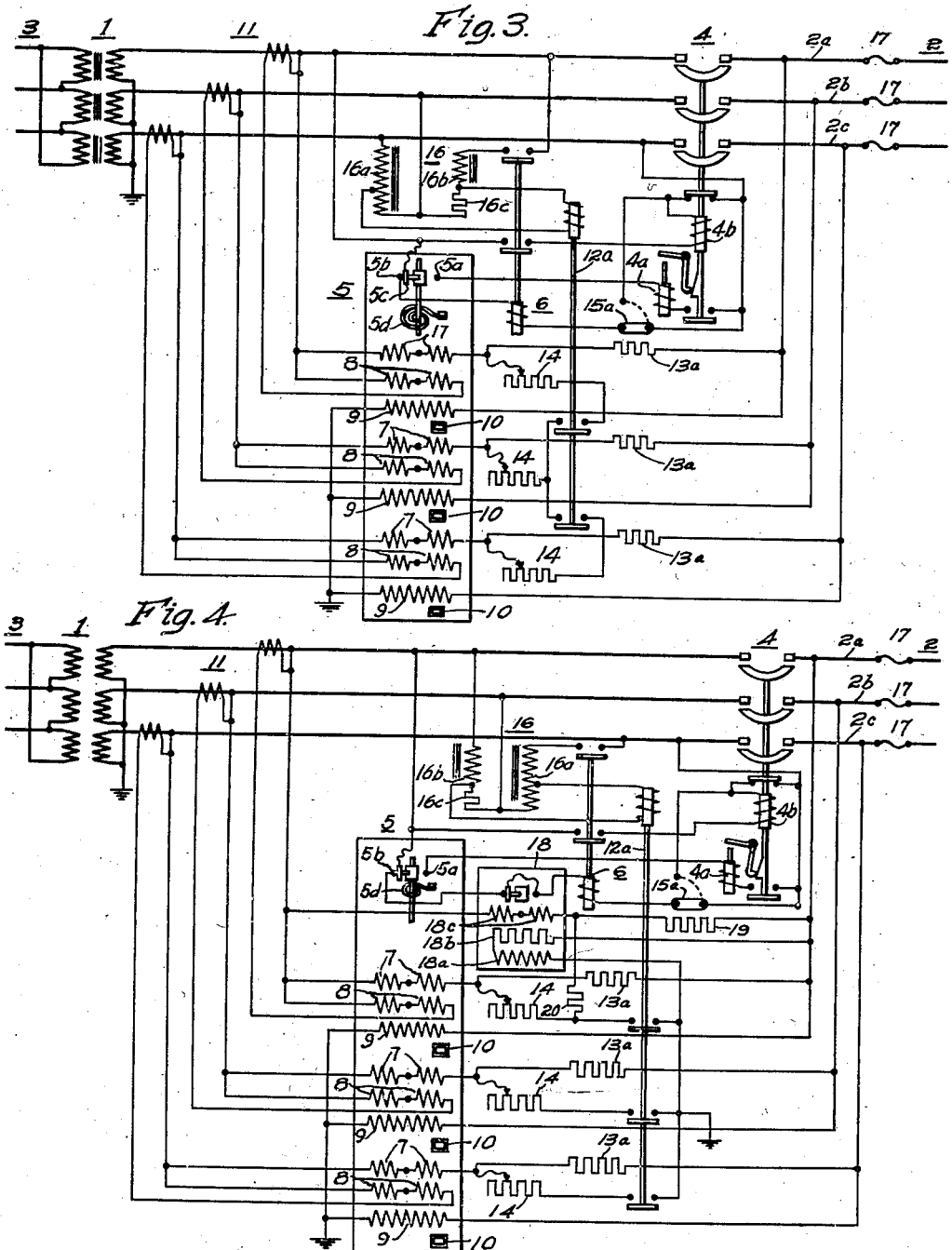

April 16, 1935.   J. S. PARSONS   1,997,697
AUTOMATIC NETWORK PROTECTOR
Filed Aug. 25, 1932   3 Sheets-Sheet 3

WITNESSES:
C. J. Weller.
Geo. O. Harrison.

INVENTOR
John S. Parsons.
BY
ATTORNEY

Patented Apr. 16, 1935

1,997,697

UNITED STATES PATENT OFFICE 1,997,697

AUTOMATIC NETWORK PROTECTOR

John S. Parsons, Swissvale, Pa., assignor to Westinghouse Electric & Manufacturing Company, East Pittsburgh, Pa., a corporation of Pennsylvania Application August 25, 1932, Serial No. 630,355

22 Claims. (Cl. 175—294)

My invention relates to protective apparatus for use in distribution systems and particularly to automatic protectors for controlling the connection and disconnection of power circuits in response to electrical conditions thereof.

In my United States Patent No. 1,973,097 issued September 11, 1934, on an application, Serial No. 627,083, filed July 30, 1932, and assigned to the Westinghouse Electric & Manufacturing Company, I have disclosed an automatic protector of the type indicated above, in which provision is made for increasing the sensitiveness of operation of the protector during fault conditions of the network circuit or other circuit to be protected. As explained in the above-mentioned application, the phasing windings of the master relay, which are ordinarily used in the reclosing operation of the protector to determine the relative magnitude and phase position of the voltages on either side of the protector circuit breaker, are also used as restraining windings to cause insensitive operation of the master relay when the circuit breaker is closed and circuit conditions are normal. In addition to the master relay, a second fault responsive relay, preferably responsive to a positive symmetrical component of polyphase voltage is used to open-circuit, short-circuit or otherwise modify the connections of the phasing windings during fault conditions, to thereby cause sensitive operation of the master relay.

The protector disclosed in the above-mentioned application is subject to the disadvantage that during a reclosing operation, the full current of the circuit breaker closing motor or solenoid must be carried by the master relay contact members, which at this particular time in the operating cycle may be bouncing or chattering because of the comparatively feeble closing torque exerted by the master relay in response to the phasing voltages. As the contact members of the master relay must be small and light to insure sensitiveness of the relay, the arcing which occurs at the relay contact members during a reclosing operation may be above the permissible maximum.

The disadvantage described above results from the fact that no torque, in addition to the phasing torque, is produced in the master relay during the reclosing operation. The restraining torque, which is applied when the circuit breaker is closed, is in the proper direction to maintain the relay contact members firmly closed, but as the connections for producing the restraining torque are controlled by auxiliary contact members of the circuit breaker, no restraining torque is produced until the circuit breaker is closed. Arcing at the relay contact members, therefore, results from the control of the restraining connections by contact members of the circuit breaker itself.

It is, accordingly, an object of my invention to provide a novel automatic protector in which an electromagnetically produced biasing or restraining torque is exerted on the master relay for restraining the relay during normal operating conditions when the circuit breaker is closed, and is also exerted during the interval between the establishment of proper voltage conditions for reclosure of the circuit breaker and the actual closure of the circuit breaker.

Another object of my invention is to provide a novel automatic protector in which a restraining torque shall be applied to the relay during normal circuit conditions of a circuit to be protected, shall be reduced or removed during fault conditions, and in which the control of the restraining torque shall be independent of contact members of the circuit breaker.

Figure 2:
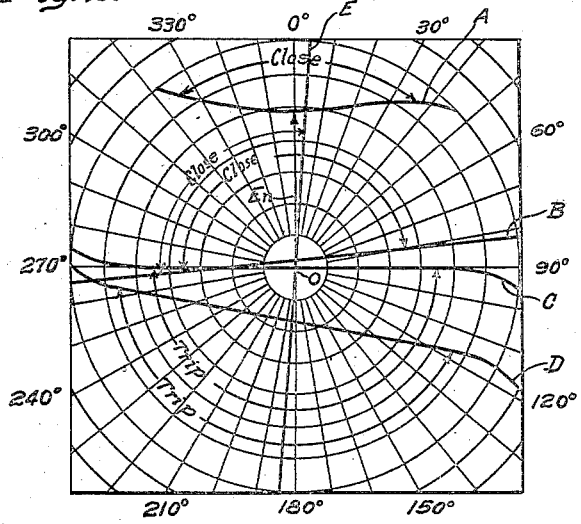

Other objects of my invention will become evident from the following detailed description taken in conjunction with the accompanying drawings, in which Figure 1 is a diagrammatic view of an automatic protector embodying my invention, Fig. 2 is a diagram in polar coordinates illustrating the operation of the protector shown in Fig. 1, and Figs. 3 to 6 are diagrammatic views, similar to Fig. 1, of modifications of the protector shown in Fig. 1.

Referring to Fig. 1 in detail, a transformer bank 1, which may be one of a number of similar banks for supplying power to a distribution network 2, is connected between a feeder 3 and one side of a protector circuit breaker 4. I have illustrated the primary windings of the transformer bank 1 connected in delta to the feeder 3 and the secondary windings connected in star with neutral grounded, but it will be understood that my invention may be practiced with other connections known in the art. The circuit breaker 4 is connected between the secondary windings of the transformer bank 1 and the conductors 2a, 2b and 2c of the network 2.

The circuit breaker 4 is provided with a trip mechanism of any suitable type illustrated as a shunt trip coil 4a and with a closing motor or coil 4b. The trip coil 4a is controlled by means of a tripping contact member 5a and a movable contact member 5c of a power-directional master relay indicated diagrammatically at 5. The closing coil 4b of the circuit breaker is controlled by means of a closing relay 6, controlled in turn by the movable contact member 5c and a closing contact member 5b of the relay 5.

The relay 5 is preferably of the polyphase induction-disc type described in my copending application mentioned above, and is provided with three independent driving magnets (not shown), upon each of which are mounted a pair of phasing windings 7, a pair of current windings 8 and a potential winding 9, in well known manner.

The power directional relay 5 is provided with a spring 5d for biasing the movable contact member 5c into engagement with the closing contact member 5b when the potential windings 9 are deenergized. An over-voltage adjusting loop indicated diagrammatically at 10, is associated with each of the potential windings 9 to overcome the biasing torque of the spring 5d and bias the movable contact member 5c into engagement with the tripping contact member 5a, when the potential windings 9 are energized, as explained by my copending application mentioned above.

The current windings 8 of the relay 5 are connected to be energized by means of a set of current transformers 11, in accordance with the phase currents in the secondary windings of the transformer bank 1.

A voltage-responsive relay 12 is provided for connecting the phasing windings 7 of the relay 5 across the main contact members of the circuit breaker 4 in series with suitable phasing resistance elements, indicated as phasing lamps 13, when the relay 12 is open, and for connecting the phasing windings 7 in series with a set of adjustable resistors 14, between the secondary terminals of the transformer bank 1 and ground, when the relay 12 is closed.

The operating coil of the voltage-responsive relay 12 is connected, in series with contact members of the closing relay 6 and a removable conducting link 15, to a voltage phase-sequence network 16, preferably of the type disclosed in the United States Patent No. 1,936,797 issued November 28, 1933, on an application of B. E. Lenehan, Serial No. 613,583 filed May 25, 1932, and assigned to the Westinghouse Electric & Manufacturing Company.

The phase-sequence network 16, which is energized from the secondary terminals of transformer bank 1, comprises an auto-transformer 16a, having a tap to provide a voltage less than half of the total voltage impressed on the auto-transformer, for example, a 40% top, and a reactor 16b and resistor 16c, having a combined lagging phase angle of 60°. Assuming that the phase rotation of the secondary voltages of the transformer bank 1 is as indicated by the subscripts a, b and c of the network conductors 2a 2b and 2c, the coil of the voltage responsive relay 12, when connected to the phase-sequence network 16, is subject to a voltage equal to the vector sum of 40% of the voltage between the b and c phase transformer secondary terminals and a voltage equal to 40% of the voltage between the a and b phase transformer secondary terminals but lagging the latter voltage by a phase angle of 60°. As explained in the above-mentioned patent of B. E. Lenehan, with such connections, the voltage-responsive relay 12 responds to a positive symmetrical component of the polyphase voltage applied to the phase-sequence network.

The voltage-responsive relay 12 is designed to close when the positive symmetrical components of transformer secondary voltage exceed a predetermined value, for example, 95% of the normal balanced network voltage, and to drop out when the positive symmetrical components fall below a predetermined minimum value, for example, 85% or 90% the normal balanced network voltage.

The current transformers 11 are preferably of a well-known saturable design to limit the maximum current which can be supplied to the current windings 8, and thereby limit the heating effect and mechanical forces which can be developed by the current windings. Similarly, the phasing lamps 13 are preferably of the tungsten filament type and have approximately 10 times as much resistance when hot as when cold to limit the maximum current and heating effect in the phasing windings 7.

The potential windings 9 of the relay 5 are connected between the conductors 2a, 2b and 2c of the distribution network 2 and ground, to respond to the network star voltages. A set of fuses 17 is provided for protecting the transformer bank 1 against excessive currents in the normal direction and also against excessive reverse currents which may be occasioned by a fault condition which reduces the voltages applied to the potential windings 9 to such a low value that operation of the relay 5 is uncertain.

The three groups of current windings 8 and potential windings 9 are connected in such relative directions that when power flows from the transformer bank 1 to the distribution network 2, the torque of each group tends to maintain engagement of the movable contact member 5c and the closing contact member 5b. When power flows from the network 2 to the transformer bank 1, the torque produced by each of the groups of current and potential windings tends to rotate the movable contact member 5c out of engagement with the closing contact member 5b and into engagement with the tripping contact member 5a.

The phasing windings 7 are connected in such relative directions, as compared with the potential windings 9, that when the circuit breaker 4 is open, the voltage responsive relay 12 is open and the distribution network 2 is energized from other transformer banks (not shown), the torque of each of the groups of potential and phasing windings tends to cause engagement of the movable contact member 5c and the closing contact member 5b, if the transformer secondary voltage is in phase with the network voltage and exceeds the network voltage by more than a predetermined amount, such as a fraction of a volt. If the component of transformer secondary voltage in phase with the network voltage fails to exceed the network voltage by the predetermined amount mentioned above, the movable contact member 5c of the relay 5 is maintained in engagement with the tripping contact member 5a.

The relationship of transformer secondary voltage and network voltage necessary to cause a closing operation of the relay may better be understood by reference to curve A of Fig. 2. Referring to Fig. 2, the vector $E_n$, which is taken as the reference vector, represents the distribution network voltage. If a vector representing the transformer secondary voltage be drawn on this figure from the origin 0, to the same scale as $E_n$ and displaced therefrom by the phase angle existing between the transformer secondary voltage and the network voltage, a closing operation of the relay 5 is indicated if the transformer secondary voltage vector terminates above the curve A. If the vector corresponding to the transformer secondary voltage terminates below the curve A, the voltage conditions indicated are such that a tripping torque tending to maintain engagement of the movable contact member 5c and the tripping contact member 5a of relay 5 would result.

Curve B of Fig. 2 represents the central part of curve A plotted on a larger scale and moved downward to the point at which the origin 0 coincides with upper end of the vector $En$. Curve B represents the range of phasing voltages encountered during normal operation. It will be noted that curve B lies slightly above the origin 0. This displacement corresponds to a biasing torque in the relay 5 acting in the opposite direction to the biasing torque of the spring 5d, and is produced by the over-voltage adjusting loops 10. When the potential windings 9 are energized, the adjusting loops 10 shade or lag part of the flux produced by the potential windings, as explained in my copending application mentioned above, and in this way produce a biasing torque opposite to and greater than the torque of the spring 5d. When the potential windings 9 are deenergized, as is the case when the network 2 is dead, the over-voltage adjusting loops 10 have substantially no effect, and the spring 5d acts to maintain the movable contact member 5c in engagement with the closing contact member 5b.

Curve C of Fig. 2 represents the limiting locus of line current vectors which will cause a tripping operation of the relay 5 when the potential coils 9 are energized and the phasing windings 7 are short-circuited through the phasing lamps 13. It will be understood that in an induction disc relay of the type under consideration, the phasing windings are mounted on the same pole members as the current windings. The effect of the phasing windings 7 of the relay 5, when short-circuited, therefore, is to cause the flux produced by the current windings 8 to lag the current in the current windings in a manner similar to the operation of a shading coil. The constants of the phasing lamps 13 and of the various elements of the relay 5 are so related that the watt tripping characteristic of the relay, illustrated by the curve C of Fig. 2, is produced when the phasing windings 7 of the relay are short-circuited through the phasing lamps 13, as explained in my copending application mentioned above.

Curve D of Fig. 2 represents the limiting locus of line current vectors which will cause a tripping operation of the relay 5 when the phasing windings 7 are connected in star in series with the resistors 14 between the secondary terminals of transformer bank 1 and ground. It will be noted that when the phasing windings 7 are connected in this manner, the network voltage causes a component of current to flow in them, and as the resistors 14 must be comparatively large to limit this current flow, the lagging effect of the phasing windings upon the current windings is greatly reduced. The effect of the phasing windings 7, with the latter connections, is, therefore, to shift the curve C downward and rotate it clockwise to produce curve D. Curve D represents the tripping characteristic of the relay 5 for insensitive operation. The downward displacement of this curve represents the restraining torque, which can be adjusted by adjusting the resistors 14. The clockwise rotation of curve D is desirable as it makes the operation of the relay on lagging reverse currents more positive.

The operation of the protector shown in Fig. 1 may be set forth as follows: It is assumed that initially both the feeder 3 and the distribution network 2 are deenergized and that the circuit breaker 4 and various relays are open as shown in the figure.

If the feeder 3 is first energized, the transformer bank 1 develops a secondary voltage, but as the circuit breaker 4 is open, substantially no current flows in the secondary windings of the transformer bank 1. A negligibly small current is drawn by the phase sequence network 16, but this current is too small to affect the current windings 8. Each phase of the secondary voltage of the transformer bank 1 is now impressed on a circuit including the phasing winding 7 of the relay 5 for the corresponding phase, a phasing lamp 13 and the corresponding potential winding 9 of the relay 5, and a current flows in this circuit. If no translating devices are connected to the dead network 2, the current in each of the phasing windings 7 is in phase with the current in the corresponding potential winding 9, and no torque is exerted in the relay 5 because of the quadrature space displacement of the phasing and potential windings. If any translating devices are connected to the dead network 2, they act as a short-circuit for the comparatively high impedance potential windings 9, and in this way prevent the relay 5 from developing an appreciable torque. In either case, therefore, the biasing spring 5d acts unopposed to maintain engagement of the movable contact member 5c and the closing contact member 5b of the relay 5.

Because of the engagement of contact members 5c and 5b of the relay 5, a circuit is completed for the closing relay 6 and the latter closes. The relay 6, in closing, completes an energizing circuit for the closing coil 4b of the circuit-breaker 4 and connects the voltage responsive relay 12 to the phase sequence network 16.

The circuit breaker 4 closes, and assuming that the positive phase sequence components of the secondary voltage of transformer bank 1 exceed 95% of the normal balanced voltage, as would be the case under normal supply voltage conditions, the voltage-responsive relay 12 also closes.

The circuit breaker 4, in closing, connects the distribution network 2 to the transformer bank 1 to be energized therefrom, and in so doing completes energizing circuits for the potential windings 9 of the relay 5. The voltage-responsive relay 12, in closing, connects each of the phasing windings 7 between the corresponding secondary terminal of the transformer bank 1 and ground, in series with one of the adjustable resistors 14.

The phasing windings 7 and the potential windings 9 of the relay 5 now cooperate to produce a restraining torque in the relay 5 which causes the latter to operate with an insensitive tripping characteristic such as illustrated in curve D of Fig. 2. By adjusting the resistors 14, the restraining torque may be adjusted to meet the requirements of the particular application in which the protector is used. The insensitive setting of the relay 5 permits a considerable reverse current, such as may be produced by switching operations or synchronizing or regenerative operations of dynamo-electric machinery associated with the system, to flow without causing a tripping operation of the relay 5.

If a fault occurs on the network 2, the full capacity of the transformer bank 1 and of other transformer banks connected to the network 2 is available to burn the fault clear in the usual manner.

If a fault occurs on the feeder 3, the direction of power flow reverses and considerable reduction of one or more phase voltages occurs, depending upon the nature of the fault. In response to the reduction of voltage, the positive symmetrical components of network voltage decrease and the voltage responsive relay 12 drops out to connect each of the phasing windings 7 in a short-circuit with a phasing lamp 13. The relay 5 now operates with a sensitive setting corresponding to the tripping characteristic C of Fig 2. In response to the reverse current flowing to the fault, the movable contact member 5c of the relay 5 moves at a rapid though timed rate into engagement with the tripping contact member 5a.

Upon engagement of contact members 5c and 5a of the relay 5, a circuit for the trip coil 4a of the circuit breaker 4 is completed, and the latter trips open to disconnect the transformer bank 1 and feeder 3 from the network 2. The circuit breaker 4, in opening, interrupts the short-circuit connection of the phasing windings 7 and leaves the latter connected between the secondary terminals of the transformer bank 1 and the conductors 2a, 2b and 2c of the network 2, to respond to phasing voltages.

The relay 5 now operates with the closing characteristic indicated by curves A and B of Fig. 2. As long as the secondary voltage of transformer bank 1 remains low because of the feeder fault, or disappears because of the disconnection of the feeder 3 at its supply end, the over-voltage adjusting loop 10, with or without assistance from the phasing windings 7, produces a torque which maintains the movable contact member 5c of the relay 5 in engagement with the tripping contact member 5a.

When the fault on feeder 3 has cleared, and the component of transformer secondary voltage in phase with the network voltage exceeds the network voltage by the minimum amount corresponding to the biasing torque of the over-voltage adjusting loops 10, the movable contact member 5c of the relay 5 moves into engagement with the closing contact member 5b. Because of the small difference between the transformer secondary and network voltages, which may exist at this time, the torque of the relay 5 may be small, and the movable contact member 5c may chatter or bounce. However, as soon as contact is made, the closing relay 6 closes to complete circuits for the voltage-responsive relay 12 and the closing motor or coil 4b of the circuit breaker 4.

The voltage-responsive relay 12 closes substantially instantaneously to complete connections for establishing a restraining torque in the relay 5 in the manner previously described. The restraining torque in the relay 5 maintains the contact members 5c and 5b firmly in engagement during the remainder of the closing operation. In the meanwhile the closing motor or coil 4b operates to close the circuit breaker 4 to thereby reconnect the transformer bank 1 to the network 2.

Although the insensitive operation of the protector shown in Fig. 1 with automatic change to sensitive operation under fault conditions is preferred in the majority of applications, it may in some cases be desirable to operate the protector without the insensitive feature, so that the protector may be opened in response to the magnetizing current of the transformer bank 1 associated therewith. To obtain sensitive operation of the protector under all conditions the conducting link 15 is removed. The removal of the link 15 prevents the closure of the voltage responsive relay 12 and thereby causes the power-directional relay 5 to operate with the sensitive tripping characteristic denoted by curve C of Fig. 2 and with the closing characteristic denoted by curves A and B of Fig. 2.

Referring to Fig. 3, a modification of my invention is shown therein, in which the restraining connections disclosed in the U. S. Patent No. 1,955,940 issued April 24, 1934, on an application of M. A. Bostwick, Serial No. 630,356, filed August 25, 1932, and assigned to the Westinghouse Electric and Manufacturing Company are employed. In Fig. 3, the transformer bank 1, network 2, feeder 3, circuit breaker 4, polyphase relay 5 and current transformers 11 are constructed and connected in the same manner as the corresponding elements of Fig. 1. In Fig. 3, however, phasing resistors 13a are substituted for the phasing lamps 13, and the voltage-responsive relay 12a, corresponding to the voltage responsive relay 12 of Fig. 1, is arranged to connect the adjustable resistors 14 to an artificial neutral point to obtain a restraining torque, as explained in the patent to M. A. Bostwick mentioned above.

In Fig. 3, the closing relay 6 is connected to control the phase-sequence network 16 rather than the voltage-responsive relay 12 directly, as in Fig. 1. It is obvious that either arrangement of the closing relay 6 may be used in either modification or in other modifications to be hereinafter described.

The protector shown in Fig. 3 also differs from that shown in Fig. 1 in the connections of the link 15a corresponding to the link 15 of Fig. 1. The link 15a of Fig. 3 may be adjusted to connect the return conductor of the closing relay 6 directly to the C-phase transformer conductor to obtain insensitive operation of the protector with automatic change to sensitive operation under fault conditions, or to include back contact members of the circuit breaker 4 in the circuit of the closing relay 6, to obtain sensitive operation of the protector. The advantage of the connections shown in Fig. 3 is that the restraining torque of the relay 5 is applied during the closing operation to prevent chattering of the relay contact members, whether the link 15a is adjusted for insensitive or for sensitive operation of the protector.

The operation of the protector shown in Fig. 3 will be obvious from that described above in connection with Fig. 1.

In many applications it will be desirable to use a phasing relay in conjunction with the polyphase master relay, to prevent pumping of the protector. Fig. 4 illustrates a protector of the type shown in Fig. 3 with a phasing relay 18 added to prevent pumping. The various elements shown in Fig. 4 are identical with the corresponding elements of Fig. 3 except that the voltage responsive relay is provided with three contact members and connects the artificial neutral point of resistors 14 to ground, and the phasing relay 18 and a pair of resistors 19 and 20 are added.

The potential winding 18a of the phasing relay 18 is connected in series with a resistor 18b to respond to a network star voltage in the usual manner. The contact members of the phasing relay 18 are connected in series with the closing contact member 5b of the polyphase relay 5 in the usual manner.

The phasing windings 18c of the phasing relay 18 are connected in series with a phasing resistor 19, across the main contact members of the circuit breaker 4 which control the phase of the main power circuit from which the potential winding 18a is energized. The resistor 20 is connected to form a potentiometer with the phasing resistor 19 when the voltage responsive relay 12a is closed, to thereby produce a restraining torque in the phasing relay 18 when the relay 12a is closed. The phasing relay 18 has a well known rotated closing characteristic such as illustrated by curve E of Fig. 2.

As the closing relay 6 cannot close until both the closing contact members of the polyphase relay 5 and the closing contact members of the phasing relay 18 are closed, the vector corresponding to transformer secondary voltage must terminate in the upper left segment of the polar diagram (Fig. 2) defined by the curves B and E, to produce a closing operation of the protector. In this way pumping is prevented in a well-known manner. Immediately upon closure of the voltage-responsive relay 12 during a closing operation, a restraining torque is produced in both the polyphase relay 5 and the phasing relay 18, to prevent chattering of the relay contact members. The tripping operation of the protector is independent of the phasing relay 18 and follows curve C or curve D of Fig. 2, dependent upon the adjustment of the link 15a, as heretofore described in connection with Fig. 1. The remaining operations of the protector shown in Fig. 4 will be obvious from those heretofore described in connection with Fig. 1.

Figure 5:
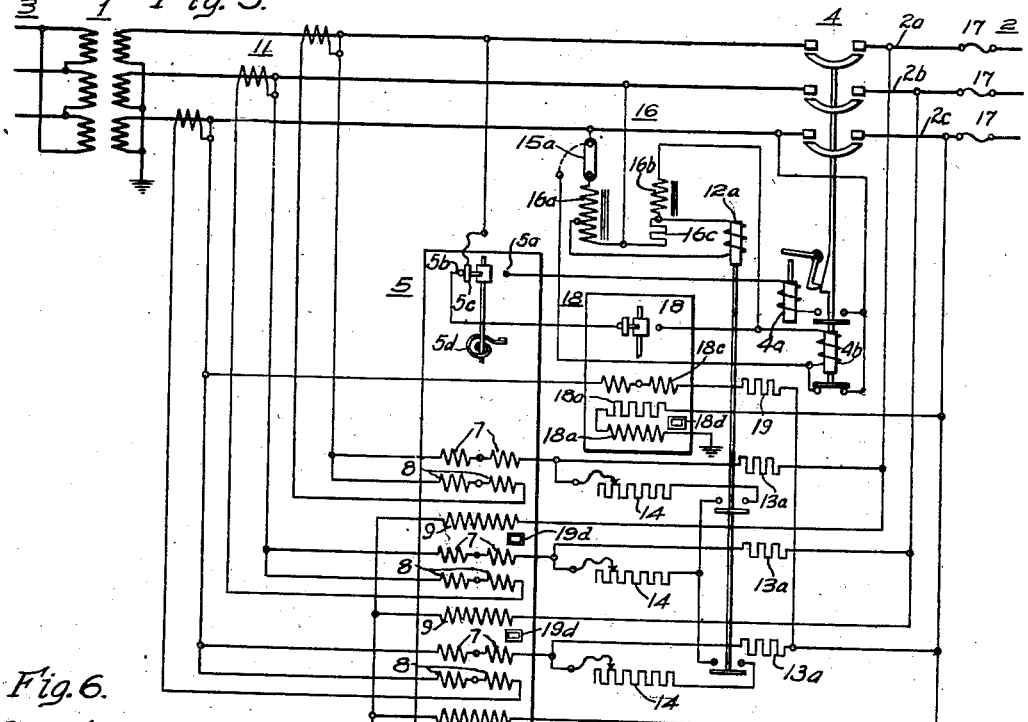

Fig. 5 shows a simplified modification of the protector shown in Fig. 4. Referring to Fig. 5, the elements shown therein are the same as the corresponding elements of Fig. 4 except that the closing relay 6, the resistor 20 and one set of contact members of the voltage-responsive relay 12a have been eliminated. In the Fig. 5 modification, the closing contact members of the polyphase relay 5 and the contact members of the phasing relay 18 control the closing coil 4b of the circuit breaker 4 and a terminal of the phase-sequence network 16 directly. The link 15a is, in this modification, connected to control a terminal of the phase-sequence network 16, rather than the circuit of the relay 6.

As the resistor 20 has been omitted, the restraining torque for the phasing relay must be obtained by other means. In this modification, the overvoltage adjusting loop of the phasing relay 18, indicated at 18d, is adjusted to maintain the relay contact members firmly closed when the potential winding 18a is energized and the phasing windings 18c are short-circuited through the phasing resistor 19. In this way the contact members of the phasing relay are maintained closed when the circuit breaker 4 is closed. The operation of the modification shown in Fig. 5 is otherwise the same as that shown in Fig. 4.

Figure 6:
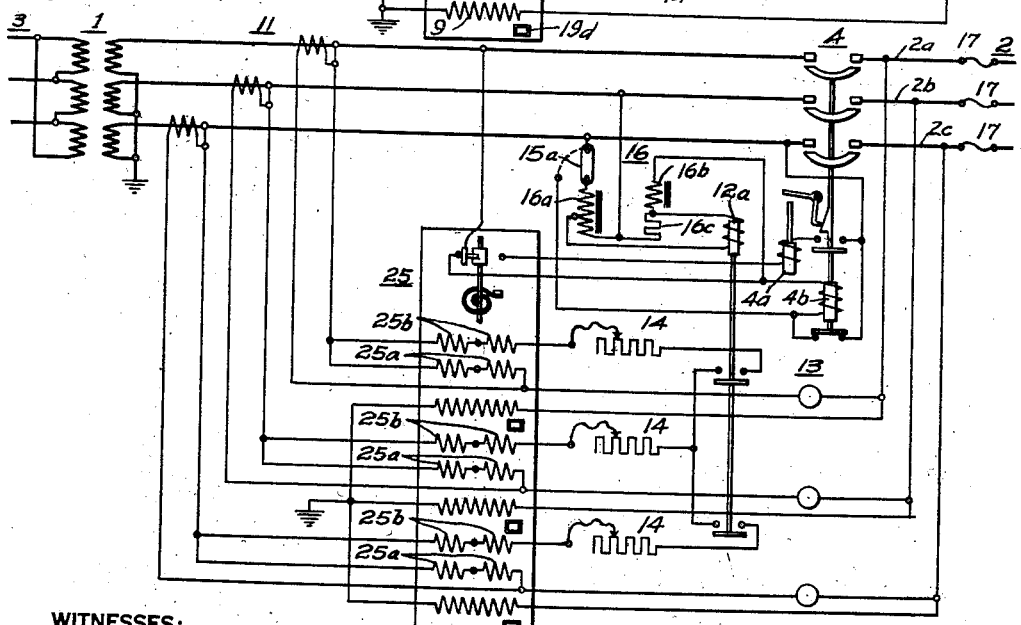

Fig. 6 shows an application of the relay disclosed in the U. S. patent to A. H. Kehoe No. 1,787,943, issued January 6, 1931 on an application Serial No. 690,014, filed February 1, 1924 and assigned to the Westinghouse Electric and Manufacturing Company, to the protector shown in Fig. 5.

Referring to Fig. 6, the polyphase relay 25 which is substituted for the relay 5 of Fig. 5, is provided with three pairs of windings 25a which function as both current windings and phasing windings, as described in the above-mentioned patent to Kehoe. Three pairs of additional windings 25b, mounted on the same poles as the windings 25a are provided for producing the restraining torque, obtained in the other modifications by the phasing windings. Phasing lamps 13 are used rather than the phasing resistors 13a of Fig. 5. The phasing relay 18 of Fig. 5 has been omitted in Fig. 6. Otherwise the protector shown in Fig. 6 is identical in construction and operation with the protector shown in Fig. 5.

I do not intend that the present invention shall be restricted to the specific structural details, arrangement of parts or circuit connections herein set forth as various modications thereof may be effected without departing from the spirit and scope of my invention. I desire therefore, that only such limitations shall be imposed as are indicated in the appended claims.

I claim as my invention:

1. In electrical protective apparatus, a circuit breaker, a master relay having an element operable to a first position for causing said circuit breaker to close and operable to a second position for causing said circuit breaker to open, means including electrical connections for biasing said element to said first position to cause insensitive operation of said relay and means including a fault-responsive relay for controlling said connections independently of the open or closed condition of said circuit breaker.

2. In a distribution system, a pair of electric power circuits, a circuit breaker for controlling the connection and disconnection of said circuits, means including a relay for controlling said circuit breaker, means for producing a biasing force in said relay to cause insensitive operation thereof, means for rendering said second-mentioned means effective during closure of said circuit breaker and during normal operating conditions of said circuits after said circuit breaker is closed, and means responsive to an abnormal circuit condition of one of said circuits for rendering said second-mentioned means ineffective during a fault condition.

3. In a distribution system, a pair of electric power circuits, a circuit breaker for controlling the connection and disconnection of said circuits, electromagnetic means for causing said circuit breaker to open in response to power flow in a predetermined direction between said circuits and for causing said circuit breaker to close in response to a predetermined relationship of voltages of said circuits, means for producing a biasing force in said electromagnetic means for causing insensitive operation thereof, means effective upon the establishment of said predetermined relationship of voltages for rendering said second-mentioned means effective before closure of said circuit breaker and for maintaining said second-mentioned means in effective condition while said circuit breaker is closed and said circuits are in normal operating condition, and means responsive to an abnormal circuit condition of one of said circuits for rendering said second-mentioned means ineffective during a fault condition.

4. In a distribution system, a pair of alternating-current power circuits, a circuit-breaker for controlling the connection and disconnection of said circuits, means including an electroresponsive device for causing said circuit breaker to open in response to power flow in a predetermined direction between said circuits and for causing said circuit breaker to close in response to a predetermined relationship of voltages of said circuits, means for producing a biasing effect in said device to cause insensitive operation thereof, means effective upon the establishment of said predetermined relationship of voltages for rendering said second-mentioned means effective before closure of said circuit breaker and for maintaining said second-mentioned means in effective condition while said circuit breaker is closed and said circuits are in normal operating condition, and means responsive to an abnormal circuit condition of one of said circuits for operating upon said second-mentioned means to reduce said biasing effect during a fault condition.

5. In a distribution system, a pair of polyphase alternating-current power circuits, a circuit breaker for controlling the connection and disconnection of said circuits, means including an induction relay for causing said circuit breaker to open in response to predetermined current and voltage conditions of said circuits and for causing said circuit breaker to close in response to a predetermined relationship of voltages of said circuits, said relay having electromagnetic elements, means for energizing an electromagnetic element of said relay in accordance with the voltage of one of said circuits for producing a restraining torque in said relay, means for rendering said second-mentioned means effective upon the establishment of said predetermined relationship of voltages before said circuit breaker is closed and for maintaining said second-mentioned means in effective condition while said circuit breaker is closed and said circuits are in normal operating condition, and means responsive to an abnormal phase-sequence condition of one of said circuits for rendering said second-mentioned means ineffective during a fault condition.

6. In a distribution system, a pair of alternating-current power circuits, a circuit breaker for controlling the connection and disconnection of said circuits, means including an induction relay for causing said circuit breaker to open in response to predetermined voltage and current conditions of said circuits and for causing said circuit breaker to close in response to a predetermined relationship of voltages of said circuits, means for producing a restraining torque in said relay to cause insensitive operation thereof, means effective upon the establishment of said predetermined relationship of voltages for rendering said second-mentioned means effective before closure of said circuit breaker and for maintaining said second-mentioned means in effective condition while said circuit breaker is closed and said circuits are in normal operating condition, and means responsive to an abnormal circuit condition of one of said circuits for rendering said second-mentioned means ineffective during a fault condition.

7. In a distribution system, a pair of electric power circuits, a circuit breaker for controlling the connection and disconnection of said circuits, relay means for causing said circuit breaker to open in response to predetermined voltage and current conditions of said circuits and for causing said circuit breaker to close in response to a predetermined relationship of voltages of said circuits, means for restraining said relay means for causing insensitive operation thereof, means effective upon the establishment of said predetermined relationship of voltages for rendering said restraining means effective before closure of said circuit breaker and for maintaining said restraining means in effective condition while said circuit breaker is closed and said circuits are in normal operating condition, and means responsive to an abnormal voltage condition of one of said circuits for rendering said restraining means ineffective during a condition of low voltage of said circuits.

8. In a distribution system, a pair of polyphase alternating-current power circuits, a circuit breaker for controlling the connection and disconnection of said circuits, means including an induction relay for causing said circuit breaker to open in response to predetermined voltage and current conditions of said circuits and for causing said circuit breaker to close in response to a predetermined relationship of voltages of said circuits, means for producing a restraining torque in said relay to cause insensitive operation thereof, means effective upon the establishment of said predetermined relationship of voltages for rendering said restraining means effective before closure of said circuit breaker and for maintaining said restraining means in effective condition while said circuit breaker is closed and said circuits are in normal operating condition, and means responsive to a symmetrical component of polyphase voltage of one of said circuits for rendering said restraining means ineffective during a fault condition.

9. In a network protector, a circuit breaker, a closing circuit therefor, means including a master relay for controlling said circuit breaker, said relay having contact members for controlling said closing circuit, means including electrical connections for exerting a biasing force in said relay for maintaining said contact members engaged, means responsive to engagement of said contact members for rendering said biasing means effective before closure of said circuit breaker and for maintaining said biasing means in effective condition after closure of said circuit breaker to cause insensitive operation of said relay, and a manually adjustable conducting element for modifying said electrical connections to cause said biasing force to be exerted only while said closing circuit is energized, to cause sensitive operation of said relay.

10. In a network protector, a circuit breaker, a closing circuit therefor, means including a master relay for controlling said circuit breaker, said relay having contact members for controlling said closing circuit, means including electrical connections for exerting a biasing force in said relay for maintaining said contact members engaged, means responsive to engagement of said contact members for rendering said biasing means effective before closure of said circuit breaker and for maintaining said biasing means in effective condition after closure of said circuit breaker to cause insensitive operation of said relay, fault responsive means for rendering said biasing means ineffective during a fault condition and a manually adjustable conducting element for modifying said electrical connections to cause said biasing force to be exerted only while said closing circuit is energized, to cause sensitive operation of said relay during normal conditions and fault conditions.

11. In a network protector, a circuit breaker, control means for said circuit breaker including a master relay and a phasing relay, each of said relays having an element operable to a predetermined closing position, means including electrical connections for biasing each of said elements to closing position and means for automatically controlling said connections during operation of said control means.

12. In a network protector, a circuit breaker, control means for said circuit breaker including a master relay and a phasing relay, each of said relays having an element operable to a predetermined closing position, means including electrical connections for biasing each of said elements to closing position, and means for controlling said connections to bias said elements during closure of said circuit breaker and after said circuit breaker is closed.

13. In a network protector, a circuit breaker, control means for said circuit breaker including a master relay and a phasing relay, each of said relays having an element operable to a predetermined closing position, means including electrical connections for biasing each of said elements to closing position, means for controlling said connections to bias said elements during closure of said circuit breaker and after said circuit breaker is closed during normal conditions and fault responsive means for modifying said connections during fault conditions.

14. In a distribution system, a pair of electric power circuits, a circuit breaker for controlling the connection and disconnection of said circuits, means including a relay for controlling said circuit breaker, said relay having a potential winding, a current winding and a phasing winding, means for energizing said phasing winding to produce a biasing force in said relay to cause insensitive operation thereof, means independent of the open or closed condition of said circuit breaker for rendering said second-mentioned means effective, and means responsive to an abnormal circuit condition of one of said circuits for rendering said second-mentioned means ineffective.

15. In a distribution system, a pair of alternating current power circuits, a circuit breaker for controlling the connection and disconnection of said circuits, means including an induction device for causing said circuit breaker to open in response to predetermined current and voltage conditions of said circuits and for causing said circuit breaker to close in response to a predetermined relationship of voltages of said circuits, said device having a potential winding, a current winding and a phasing winding, means for energizing said phasing winding to produce a biasing force in said device to cause insensitive operation thereof, and means for rendering said second-mentioned means effective upon the establishment of said predetermined relationship of voltages before said circuit breaker is closed and for maintaining said second-mentioned means in effective condition while said circuit breaker is closed and said circuits are in normal operating condition.

16. In a distribution system, a pair of electric power circuits, a circuit breaker for controlling the connection and disconnection of said circuits, means including a relay for controlling said circuit breaker, said relay having a potential winding, a combined current and phasing winding and an additional winding, means for energizing said additional winding to produce a biasing force in said relay to cause insensitive operation thereof, means independent of the open or closed condition of said circuit breaker for rendering said second-mentioned means effective, and means responsive to an abnormal circuit condition of one of said circuits for rendering said second-mentioned means ineffective.

17. In a distribution system, a pair of alternating current power circuits, a circuit breaker for controlling the connection and disconnection of said circuits, means including an induction device for causing said circuit breaker to open in response to predetermined current and voltage conditions of said circuits and for causing said circuit breaker to close in response to a predetermined relationship of voltages of said circuits, said device having a potential winding, a combined current and phasing winding and an additional winding, means for energizing said additional winding to produce a biasing force in said device to cause insensitive operation thereof, and means for rendering said second-mentioned means effective upon the establishment of said predetermined relationship of voltages before said circuit breaker is closed and for maintaining said second-mentioned means in effective condition while said circuit breaker is closed and said circuits are in normal operating condition.

18. In protective apparatus for a polyphase alternating current circuit, a circuit breaker, a master relay having an element operable to a first position for causing said circuit breaker to close and operable to a second position for causing said circuit breaker to open, means including electrical connections for biasing said element to said first position to cause insensitive operation of said relay, and means responsive to a symmetrical component of a polyphase electrical quantity of said circuit for controlling said connections independently of the open or closed condition of said circuit breaker.

19. In a distribution system, a pair of polyphase alternating-current circuits, a circuit breaker for controlling the connection and disconnection of said circuits, means including a relay for controlling said circuit breaker, means for producing a biasing force in said relay to cause insensitive operation thereof, means for rendering said second-mentioned means effective during closure of said circuit breaker and during normal operating conditions of said circuits after said circuit breaker is closed, and means responsive to a symmetrical component of a polyphase electrical quantity of one of said circuits for rendering said second-mentioned means ineffective during a fault condition.

20. In a distribution system, a pair of polyphase alternating-current circuits, a circuit breaker for controlling the connection and disconnection of said circuits, means including a relay for controlling said circuit breaker, means for producing a restraining force in said relay to cause insensitive operation thereof, means for rendering said restraining means effective during closure of said circuit breaker and during normal operating conditions of said circuits after said circuit breaker is closed, a phase-sequence voltage network connected to one of said circuits and a relay responsive to a symmetrical component of polyphase voltage furnished by said network for rendering said restraining means ineffective during a fault condition.

21. In a distribution system of the network type, a polyphase supply circuit having a plurality of conductors, a network load circuit, a network circuit breaker for controlling the flow of power between said circuits, fault-responsive opening means for said circuit breaker including impedance means comprising serially connected impedance portions energized directly from said conductors in accordance with a voltage condition of said supply circuit and electroresponsive means having an energizing circuit connected in parallel to part of said impedance means to be energized at reduced voltage, said electroresponsive means being operable in response to an abnormal voltage condition of said supply circuit, and voltage-responsive closing means for said circuit breaker.

22. In a distribution system of the network type, a polyphase supply circuit having a plurality of conductors, a network load circuit, a network circuit breaker for controlling the flow of power between said circuits, fault-responsive opening means for said circuit breaker including impedance means comprising serially-connected impedance portions energized directly from said conductors in accordance with a voltage condition of said supply circuit and a single-phase electro-responsive device having an energizing circuit connected in parallel to part of said impedance means to be energized at reduced voltage, said electroresponsive means being operable in response to an abnormal voltage condition of said supply circuit, and voltage-responsive closing means for said circuit breaker.

JOHN S. PARSONS.